United States Patent
Wagoner et al.

(10) Patent No.: US 10,148,205 B2
(45) Date of Patent: Dec. 4, 2018

(54) CONTROL METHOD FOR POWER CONVERTERS WITH INVERTER BLOCKS WITH SILICON CARBIDE MOSFETS

(71) Applicant: General Electric Company, Schenectady, NY (US)

(72) Inventors: Robert Gregory Wagoner, Roanoke, VA (US); Dong Dong, Schenectady, NY (US); Govardhan Ganireddy, Bangalore (IN); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/422,604

(22) Filed: Feb. 2, 2017

(65) Prior Publication Data

US 2018/0219501 A1    Aug. 2, 2018

(51) Int. Cl.
*H02M 7/53862* (2007.01)
*H02M 7/5387* (2007.01)
*H02P 9/00* (2006.01)
*H02M 3/335* (2006.01)
*H02M 5/42* (2006.01)
*H02M 1/084* (2006.01)

(52) U.S. Cl.
CPC ............ *H02P 9/007* (2013.01); *H02M 1/084* (2013.01); *H02M 3/33546* (2013.01); *H02M 5/42* (2013.01)

(58) Field of Classification Search
CPC ..... Y02E 10/723; Y02E 10/76; Y02E 10/763; H02M 5/40; H02M 5/458; H02M 7/53; H02M 7/53862; H02M 7/5387
See application file for complete search history.

(56) References Cited

U.S. PATENT DOCUMENTS 5,638,263 A    6/1997  Opal et al.
5,896,909 A    11/1999 Hammond et al.
(Continued)

OTHER PUBLICATIONS

Li et al., "Capacitor Voltage Control in a Cascaded Multilevel Inverter as a Static Var Generator", Power Electronics and Motion Control Conference, 2006. IPEMC 2006. CES/IEEE 5th International, pp. 1-5, Aug. 14-16, 2006, Shanghai.
(Continued)

*Primary Examiner* — Gary L Laxton
(74) *Attorney, Agent, or Firm* — Dority & Manning, P.A.

(57) ABSTRACT

Systems and methods for operating a power converter with a plurality of inverter blocks with silicon carbide MOSFETs are provided. A converter can include a plurality of inverter blocks. Each inverter block can include a plurality of switching devices. The plurality of switching devices can include one or more silicon carbide MOSFETs. A control method can include providing, by a control system, one or more gating commands to a first inverter block in the plurality of inverter blocks. The control method can further include implementing, by the control system, a gating command delay to generate a first delayed gating command based at least in part on the one or more gating commands. The control method can further include providing, by the control system, the first delayed gating command to a second inverter block in the plurality of inverter blocks.

17 Claims, 8 Drawing Sheets

(56) References Cited

U.S. PATENT DOCUMENTS

| | | | |
|---|---|---|---|
| 6,031,738 A | 2/2000 | Lipo et al. | |
| 6,222,284 B1 | 4/2001 | Hammond et al. | |
| 6,697,271 B2 | 2/2004 | Corzine | |
| 6,781,351 B2 | 8/2004 | Mednik et al. | |
| 7,568,931 B2 | 8/2009 | Hammond | |
| 7,710,082 B2 | 5/2010 | Valderrama et al. | |
| 7,787,270 B2 * | 8/2010 | NadimpalliRaju | H02J 4/00 363/37 |
| 7,800,254 B2 | 9/2010 | Hammond | |
| 8,008,923 B2 | 8/2011 | Hammond | |
| 8,093,764 B2 | 1/2012 | Hammond | |
| 8,174,138 B2 * | 5/2012 | Castelli Dezza | H02M 7/25 290/42 |
| 8,207,812 B2 | 6/2012 | Roc et al. | |
| 8,441,147 B2 | 5/2013 | Hammond | |
| 8,619,446 B2 | 12/2013 | Liu et al. | |
| 8,817,503 B2 * | 8/2014 | Inoue | H02M 1/08 363/127 |
| 8,988,860 B2 | 3/2015 | Hammond | |
| 9,184,673 B2 | 11/2015 | Mihalache | |
| 9,277,683 B2 | 3/2016 | Ionescu et al. | |
| 9,407,165 B2 | 8/2016 | Wu et al. | |
| 2008/0218320 A1 * | 9/2008 | Jang | H02M 7/49 363/1 |
| 2012/0218795 A1 | 8/2012 | Mihalache | |
| 2015/0340964 A1 | 11/2015 | Modeer | |

OTHER PUBLICATIONS

Zhao et al., "Voltage and Power Balance Control for a Cascaded H-Bridge Converter-Based Solid-State Transformer", IEEE Transactions on Power Electronics, vol. 28, Issue: 4, pp. 1523-1532, Apr. 2013.

Tripathi et al., "Control and performance of a single-phase dual active half bridge converter based on 15kV SiC IGBT and 1200V SiC MOSFET", Applied Power Electronics Conference and Exposition (APEC), 2014 Twenty-Ninth Annual IEEE, pp. 2120-2125, Mar. 16-20, 2014, Fort Worth, TX.

\* cited by examiner

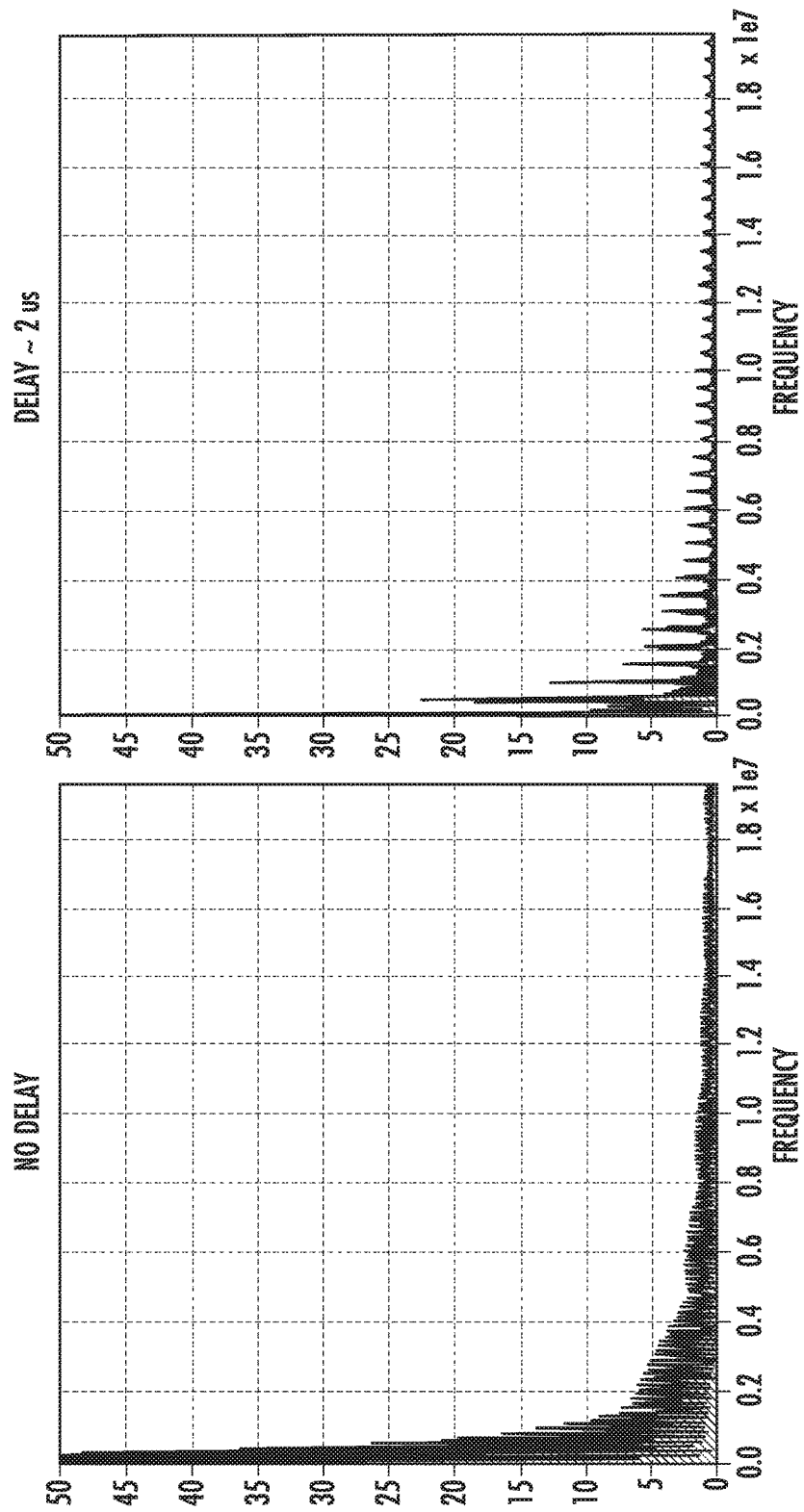

CONTROL METHOD FOR POWER CONVERTERS WITH INVERTER BLOCKS WITH SILICON CARBIDE MOSFETS

FIELD

The present subject matter relates generally to power systems, and more particularly to systems and methods for providing gating commands to power converters utilizing inverter blocks with silicon carbide MOSFETs.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a control method for operating a converter. The converter can include a plurality of inverter blocks. Each inverter block can include a plurality of switching devices. The plurality of switching devices can include one or more silicon carbide MOSFETs. The control method can include providing, by a control system, one or more gating commands to a first inverter block in the plurality of inverter blocks. The control method can further include implementing, by the control system, a gating command delay to generate a first delayed gating command based at least in part on the one or more gating commands. The control method can further include providing, by the control system, the first delayed gating command to a second inverter block in the plurality of inverter blocks.

Another example aspect of the present disclosure is directed to a power conversion system. The power conversion system can include a converter. The converter can include a plurality of inverter blocks. Each inverter block can include a plurality of switching devices. The plurality of switching devices can include one or more silicon carbide MOSFETs. The power conversion system can also include a control system comprising a plurality of gate drive cards. The control system can be configured to control operation of the converter by providing one or more gating commands to the plurality of inverter blocks. Each inverter block can have one or more associated gate drive cards from the plurality of gate drive cards configured to provide the one or more gating commands to the plurality of switching devices in the inverter block. At least one of the one or more associated gate drive cards for each inverter block can be daisy chained to at least one of the one or more associated gate drive cards of another inverter block.

Another example aspect of the present disclosure is directed a wind power generation system. The wind power generation system can include a wind power generator configured to generate AC power and an AC to DC converter coupled to the wind power generator. The AC to DC converter can be configured to convert the AC power from the wind power generator to a DC power. The wind power generation system can further include a DC link coupled to the AC to DC converter. The DC link can be configured to receive DC power from the AC to DC converter. The wind power generation system can further include a DC to AC converter coupled to the DC link. The DC to AC converter can be configured to receive DC power from the DC link. The DC to AC converter can include a plurality of inverter blocks. Each inverter block can include a plurality of switching devices. The plurality of switching devices can include one or more silicon carbide MOSFETs. The wind power generation system can further include a control system comprising a plurality of gate drive cards. The control system can be configured to control operation of the DC to AC converter by providing one or more gating commands to the plurality of inverter blocks. Each inverter block can have one or more associated gate drive cards from the plurality of gate drive cards configured to provide the one or more gating commands to the plurality of switching devices in the inverter block. At least one of the one or more associated gate drive cards for each inverter block can be daisy chained to at least one of the one or more associated gate drive cards of another inverter block. The control system can be further configured to implement a gating command delay in gating commands provided by the gate drive cards.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts a graph of electromagnetic interference in conventional power converters;

FIG. 7 depicts a graph of electromagnetic interference in a power converter according to example aspects of the present disclosure;

DETAILED DESCRIPTION

Figure 1:
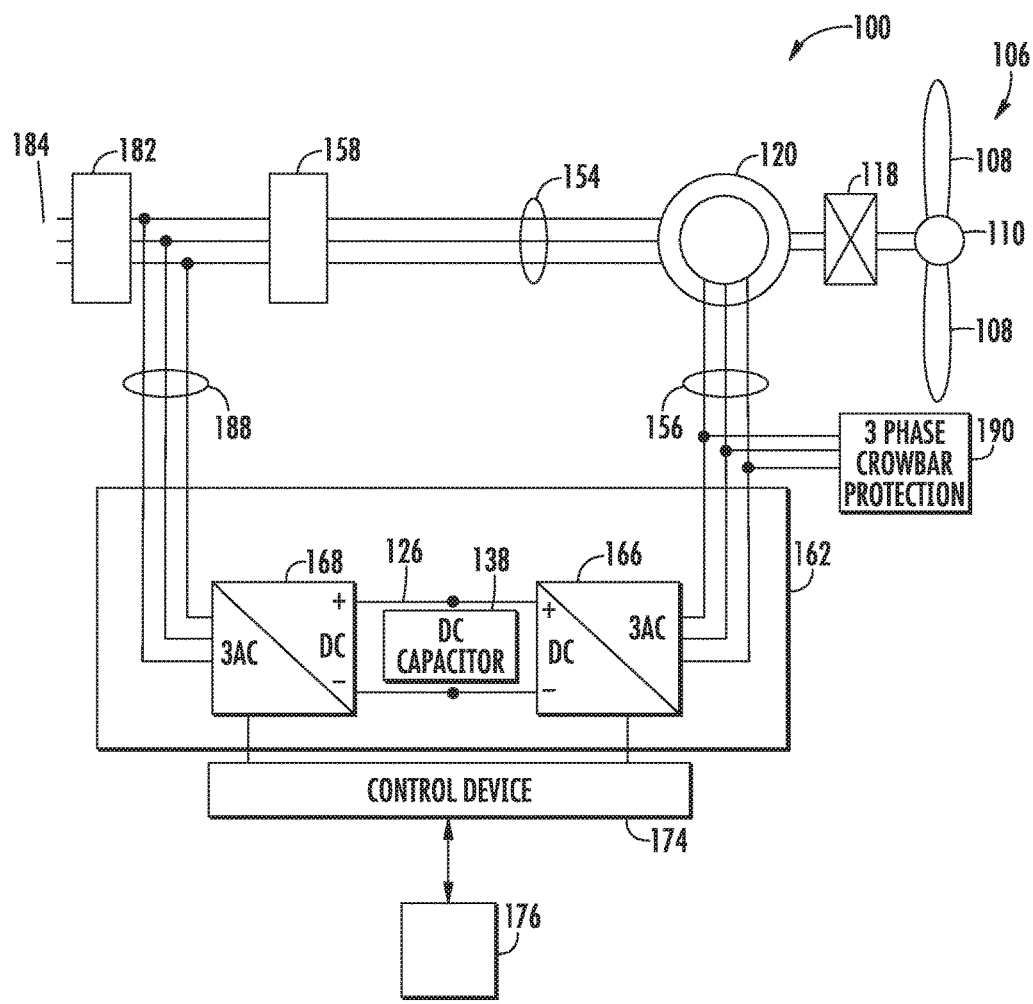
FIG. 1 depicts an example wind power generation system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components or limit the number of individual components in an apparatus. As used herein, the term "approximately" means within plus or minus ten percent of the stated value.

Example aspects of the present disclosure are directed to systems and methods for controlling a power converter with a plurality of inverter blocks utilizing SiC MOSFETs. For example, power generation systems, such as systems using doubly fed induction generators ("DFIGs") as power generation units, can use one or more power converters to convert power from a low voltage multiphase alternating current power into a medium voltage multiphase alternating current power. As used herein, "LV" voltage can be a power less than about 1.5 kilovolts. As used herein, "MV" voltage can be power greater than about 1.5 kilovolts and less than about 100 kilovolts. As used herein, the term "about" can mean within 20% of the stated value.

In an embodiment, the power converter can be a multiphase (e.g., three phase) power converter configured to convert a multiphase power output from a power generator. The power converter can include, for example, a first power converter configured to convert an AC power output from a power generator, such as a DFIG, into a DC power, and provide the DC power to a DC link. A second power converter can be configured to convert the DC power from the DC link into an AC power suitable for use on an energy grid. For example, the second power converter can be a DC to DC to AC power converter, and can utilize SiC MOSFETs as the power semiconductors, thereby allowing very high switching frequency.

The second power converter can include, for example, a plurality of inverter blocks. Each inverter block can include a plurality of bridge circuits configured to convert power, and each bridge circuit can include one or more SiC MOSFETs as switching devices. For example, each inverter block can be a DC to DC to AC inverter block, and a plurality of inverter blocks can be coupled in parallel on a LV side and coupled in series on a MV side. Each DC to DC to AC inverter block can include a first DC to AC conversion entity configured to convert LV DC power from the DC link to a high frequency LV AC voltage, an isolation transformer configured to provide isolation, a second AC to DC conversion entity configured to convert the LV AC power to a LV DC power, and a third DC to AC conversion entity configured to convert the LV DC power to an LV AC power suitable for use on an energy grid. A plurality of inverter blocks can be connected in series to build a MV AC voltage suitable for use on a MV AC grid.

In an example topology, a plurality of inverter blocks can be configured in a three level topology from line to neutral, allowing an output voltage of a positive voltage, zero voltage, or a negative voltage for each phase. For example, the power converter can include six inverter blocks, with each inverter block including a plurality of switching devices, such as one or more SiC MOSFETs. A control device can provide one or more gating commands to each inverter block in order to turn the switching devices on and off to generate an output voltage waveform. For example, the control device can provide one or more gating commands to a plurality of gate drive cards, which can then turn the individual switching devices in an inverter block on and off.

In such a system, each gate drive card may only be configured to drive a subset of the switching devices in an inverter block, such as, for example, four switching devices in a conversion entity forming a bridge circuit. Thus, for a power converter utilizing DC to DC to AC inverter blocks with three conversion entities, at least three gate drive cards may be required for each inverter block. Further, in a three phase power converter with six inverter blocks per phase, at least 54 gate drive cards may be required to drive all of the switching devices in the power converter. However, a typical control device configured to provide gating commands to the gate drive cards may only have enough communication channels to provide gating commands to one or two gate drive cards. Thus, in a typical configuration where each gate drive card is provided control signals directly from a control device, a significant number of control devices may be required. In such a control system, the complexity of the control system and cost associated with control devices can very significant.

Further, if the switching devices in a power converter are all turned on at the same time, the electromagnetic interference ("EMI") generated in voltages above certain frequencies can be very high. Typically, as the EMI generated by the switching devices increases, larger and more expensive filters may need to be used in order to condition the power into a form suitable for use on an electric grid. Thus, high EMI may increase the cost of a power conversion system due to costs associated with filters.

Example aspects of the present disclosure are directed to systems and methods for providing gating commands to inverter blocks in a power converter to reduce the cost and complexity of the control system and reduce the EMI generated by the power converter. For example, a power converter can include a plurality of inverter blocks. Each inverter block can include a plurality of switching devices, such as one or more SiC MOSFETs. A control system can be configured to provide one or more gating commands to a first inverter block in the plurality of inverter blocks. For example, a control device can be configured to provide one or more gating commands to one or more gate drive cards, which can be configured to drive one or more of the switching devices in the inverter block to convert power. Further, the control system can be configured to implement a gating command delay to generate a first delayed gating command based at least in part on the one or more gating commands. For example, a first gate drive card associated with the first inverter block can be configured to receive the one or more gating commands and then implement a gating command delay, such as a delay of 1-2 microseconds to generate a first delayed gating command. The control system can then be configured to provide the first delayed gating command to a second inverter block in the plurality of inverter blocks. For example, the first gate drive card can be configured to send the first delayed gating command to a second gate drive card associated with a second inverter block configured to drive one or more switching devices in the second inverter block. In an embodiment, the plurality of gate drive cards, such as the first and second gate drive cards, can be arranged in a daisy chain configuration.

Further, the control system can implement additional gating command delays to generate additional delayed gating commands and provide these additional delayed gating commands to other inverter blocks in the plurality of inverter blocks. For example, a gate drive card associated with the second inverter block can be configured to implement a second gating command delay to generate a second delayed gating command based at least in part on the first delayed gating command and further can provide the second delayed gating command to a third inverter block in the plurality of inverter blocks. Similarly, gate drive cards associated with each inverter block can be configured to implement a gating command delay to generate a delayed gating command and can provide the delayed gating command to another inverter block, such as by providing the delayed gating command to a downstream gate drive card in the daisy chain. In this way, a gating command delay can be implemented in the one or more gating commands provided to each inverter block in a power converter.

In an embodiment, the gating command delay can be based at least in part on the number of blocks in the converter. For example, the one or more gating commands can include an on/off pulse configured to turn the converter on for a period of time before turning the converter off. For example, the one or more gating commands can be a command to turn the power converter on for a period of 20 microseconds. The one or more gating commands can be provided to a first inverter block, and a control system can implement a gating command delay, such as a delay of 1 microsecond, to generate a delayed gating command and provide the delayed gating command to a second inverter block. Similarly, the control system can be configured to implement a gating command delay for each successive inverter block. For example, in a power converter with six inverter blocks, a gating command delay can be implemented by the control system before providing the delayed gating command to the second through sixth inverter blocks. Thus, if, for example, a 1 microsecond delay is implemented for each of the second through sixth inverter blocks, a total delay comprising the gating command delay for each of the second through sixth inverter blocks summed together would be 5 microseconds. In an embodiment, the total delay (e.g., 5 microseconds) can be shorter than the on period of the on/off pulse (e.g., 20 microseconds).

In an embodiment, the one or more gating commands can be one or more gating commands configured to generate a fixed pulse output. Further, in an embodiment, the gating command delay can be a delay to generate a phase shift in the fixed pulse output for each inverter block. Additionally, the phase shift can be based at least in part on the number of inverter blocks in the converter. For example, a converter can include six inverter blocks. The one or more gating commands can be one or more gating commands to generate a fixed pulse output, such as a full voltage output, for a specified period of time. For example, the fixed pulse output can be a two-thirds duty-cycle such that a full voltage is provided by an inverter block for two-thirds of a half cycle and a zero voltage for one-third of the half cycle. The one or more gating commands configured to generate a fixed pulse output can be provided to each inverter block in the converter. A gating command delay can be implemented to generate a phase shift in the fixed pulse output for each inverter block. Further, the fixed pulse output for each inverter block can be phase shifted from the fixed pulse output for all other inverter blocks. For example, the fixed pulse output for each inverter block can be phase shifted to generate a sinusoidal voltage waveform. Further, the average power processed by each inverter block can be normalized, which can simplify the cooling system for the power converter since all inverter blocks can process approximately equal power.

In this way, the systems and methods according to example aspects of the present disclosure can have a technical effect of simplifying the control system needed to control a power converter with a plurality of inverter blocks by reducing the number of control devices required by the control system. This can reduce the costs associated with the control system. Further, by introducing a delay, the amount of EMI generated by the plurality of inverter blocks can be reduced, thereby reducing the size and cost of a filter for the power converter. Additionally, the systems and methods according to example aspects of the present disclosure can allow for a desired output voltage waveform to be generated.

With reference now to the figures, example aspects of the present disclosure will be discussed in greater detail. FIG. 1 depicts a wind power generation system 100 according to example aspects of the present disclosure, which includes a DFIG 120. The present disclosure will be discussed with reference to the example wind power generation system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example wind power generation system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to an electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188. An auxiliary power feed (not depicted) can be coupled to the line side bus 188 to provide power for components used in the wind power generation system 100, such as fans, pumps, motors, and other components.

In example configurations, the rotor side converter 166 and/or the line side converter 168 are configured for normal operating mode in a three-phase, pulse width modulation (PWM) arrangement using SiC MOSFETs and/or IGBTs as switching devices. SiC MOSFETs can switch at a very high frequency as compared to conventional IGBTs. For example, SiC MOSFETs can be switched at a frequency from approximately 0.01 Hz to 10 MHz, with a typical switching frequency of 1 KHz to 400 KHz, whereas IGBTs can be switched at a frequency from approximately 0.01 Hz to 200 KHz, with a typical switching frequency of 1 KHz to 20 KHz. Additionally, SiC MOSFETs can provide advantages over ordinary MOSFETs when operated in some voltage ranges. For example, in power converters operating at 1200V-1700V on the LV side, SiC MOSFETs have lower switching losses than ordinary MOSFETs In some implementations, the rotor side converter 166 and/or the line side converter 168 can include a plurality of conversion modules, each associated with a phase of the multiphase power output of the power generator, as will be discussed in more detail with respect to FIGS. 2 and 3. The rotor side converter 166 and the line side converter 168 can be coupled via a DC link 126 across which can be a DC link capacitor 138.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus 154 side, sinusoidal multiphase (e.g. three-phase) is provided to the power delivery point (e.g., electrical grid 184). In particular, the AC power provided via the stator bus 154 can be a medium voltage ("MV") AC power. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. The rotor side power converter 166 converts the LV AC power provided from the rotor bus 156 into DC power and provides the DC power to the DC link 126. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a wind power generation system 100, the power converter 162 can be configured to convert the LV AC power to MV AC power. For example, the line side converter 168 can convert the LV DC power on the DC link 126 into a MV AC power suitable for the electrical grid 184. In particular, SiC MOSFETs used in bridge circuits of the line side power converter 168 can be modulated to convert the DC power on the DC link 126 into AC power on the line side bus 188. In addition, one or more isolation transformers coupled to one or more of the bridge circuits can be configured to step the voltage from the DC link up or down as needed. Additionally, a plurality of inverter blocks can be connected in series on the MV side to collectively step up the voltage of the power on the DC link 126 to a MV AC power. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power.

Various circuit breakers and switches, such as breaker 182, stator sync switch 158, etc. can be included in the wind power generation system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the wind power generation system 100 or for other operational considerations. Additional protection components can also be included in the wind power generation system 100. For example, as depicted in FIG. 1, a multiphase crowbar circuit 190 can be included to protect against an overvoltage condition damaging circuits of the wind power generation system 100.

The power converter 162 can receive control signals from, for instance, the control system 176 via the control device 174. The control signals can be based, among other things, on sensed conditions or operating characteristics of the wind power generation system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated.

Figure 2:
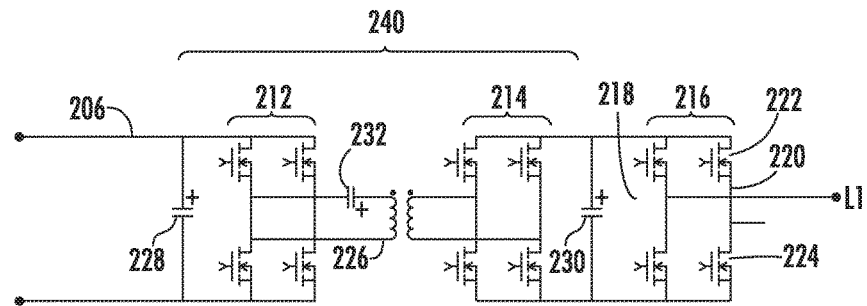
FIG. 2 depicts example elements for use in a power converter according to example aspects of the present disclosure.
Figure 3:
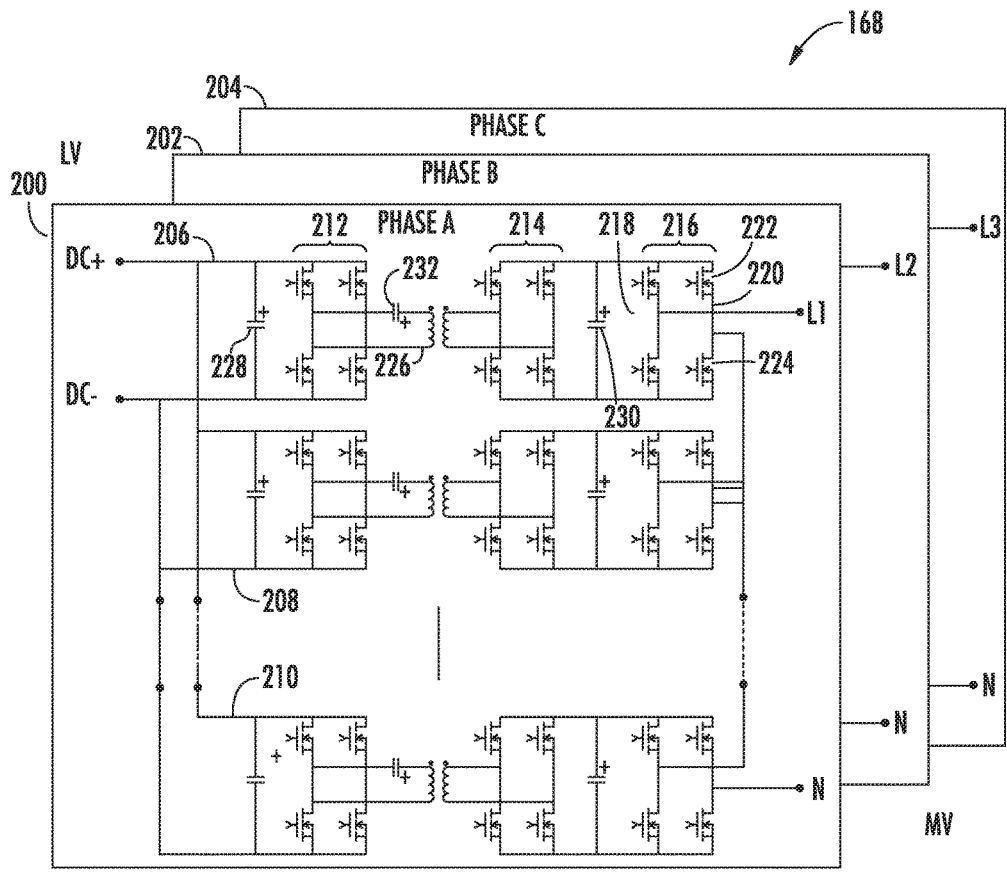
FIG. 3 depicts a power converter according to example aspects of the present disclosure.

Referring now to FIG. 2, a topology of a component in a DC to DC to AC converter is depicted. FIG. 2 depicts an example DC to DC to AC inverter block 206, which can be included in a conversion module 200 of a line side converter 168, as depicted in FIG. 3. Each inverter block 206 can include a plurality of conversion entities. For instance, inverter block 206 can include first conversion entity 212, a second conversion entity 214, and a third conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFETs, which can be operated at higher switching frequencies than conventional IGBTs. As shown, inverter block 206 further includes an isolation transformer 226. The isolation transformer 226 can be coupled to conversion entity 212 and conversion entity 214. As shown, the inverter block 206 can further include capacitors 228 and 230. For example, a capacitor 230 can be connected across a DC link between second conversion entity 214 and third conversion entity 216.

First conversion entity 212, isolation transformer 226, and second conversion entity 214 can together define an inner converter 240. Inner converter 240 can be operated to convert a LV DC power from the DC link 126 to a MV DC power. In an embodiment, inner converter 240 can be a high-frequency resonant converter. In a resonant converter configuration, a resonant capacitor 232 can be included in inner converter 240. In various embodiments, a resonant capacitor 232 can be included on a DC link side of the isolation transformer 226 as depicted in FIG. 2, on a grid side of the isolation transformer 226 (not depicted), or on both the DC link and grid sides of the isolation transformer 226 (not depicted). In another embodiment, inner converter 240 can be a hard-switched converter by removing the resonant capacitor 232. Third conversion entity 216 can also be referred to as an outer converter 216. Outer converter 216 can convert a LV DC power from the inner converter to a LV AC power suitable for use on an energy grid 184. In a typical application, outer converter 216 can be a hard-switched converter, and therefore not include a resonant capacitor.

FIG. 3 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the electrical grid 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210. For instance, as shown, conversion module 200 includes inverter blocks 206, inverter block 208, and inverter block 210. In an embodiment, each conversion module 200-204 can include any number of inverter blocks 206-210. The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the electrical grid 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the electrical grid 184. A plurality of inverter blocks can be connected in series to build a MV AC voltage suitable for use on a MV AC energy grid.

The inverter blocks 206-210 can be configured to contribute to the overall MV AC power provided by the conversion module 200. In this manner, any suitable number of inverter blocks can be included within the conversion modules 200-204. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the SiC MOSFETs and/or IGBTs to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more conversion entities as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Figure 4:
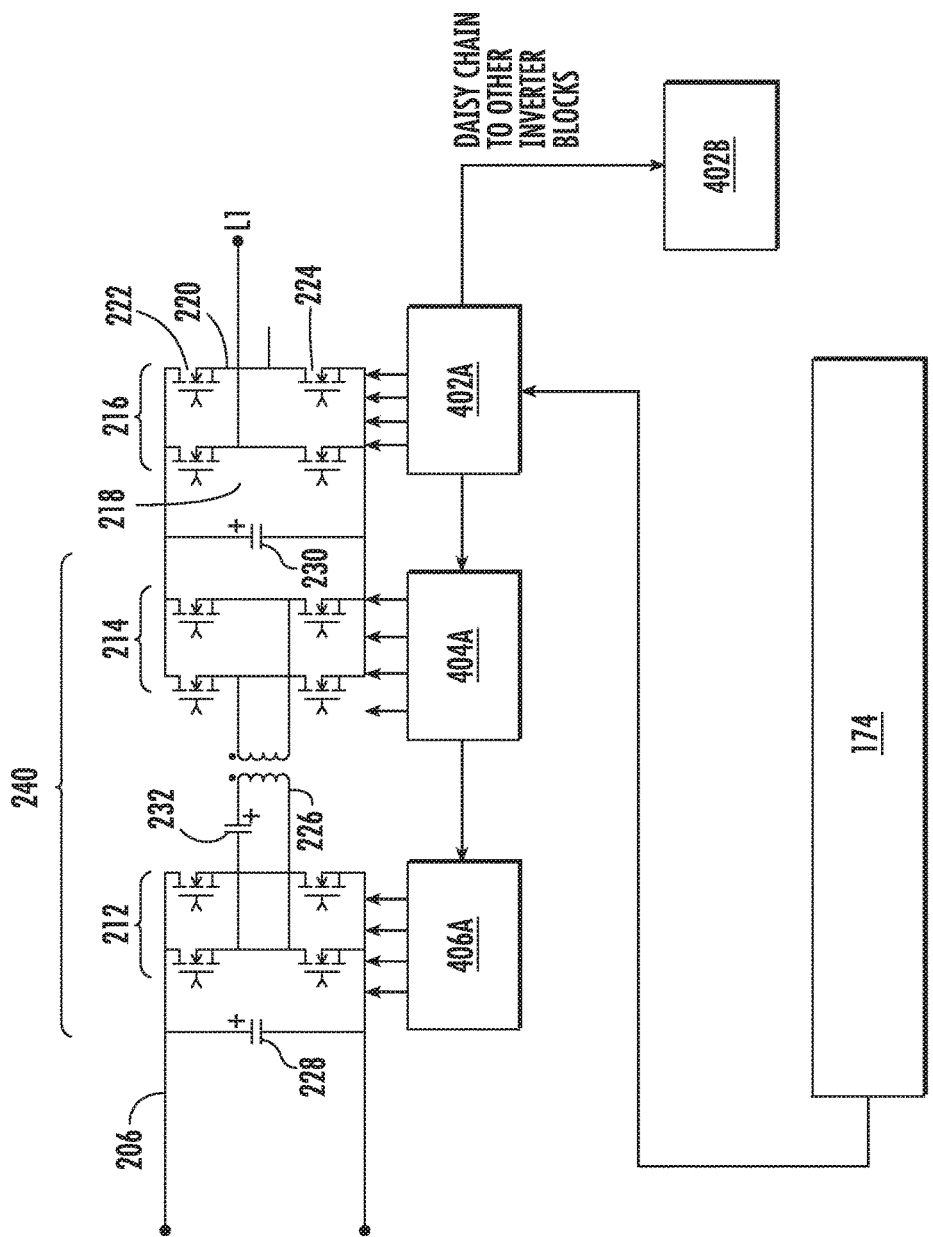
FIG. 4 depicts a portion of a power converter according to example aspects of the present disclosure.

Referring now to FIG. 4, a portion of an example power converter is depicted. Elements that are the same or similar to those in FIGS. 1-3 are referred to with the same reference numerals. As shown, an inverter block 206 is depicted along with a control device 174. Control device 174 can be configured to control operation of an inverter block 206 by, for example, providing one or more gating commands to operate the switching devices of the inverter block 206.

For example, as shown, a control device 174 can provide one or more gating commands to a first gate drive card 402A associated with third conversion entity 216. First gate drive card 402A can be configured to receive the one or more gating commands from the control device 174 and further be configured to operate the individual switching devices in third conversion entity 216. For example, first gate drive card 402A can operate the switching devices in third conversion entity 216 to output a particular voltage waveform based at least in part on the one or more gating commands.

Further, as shown, first gate card drive 402A can be connected to a second gate drive card 404A. Similar to first gate drive card 402A, second gate drive card 404A can be configured to control operation of the switching devices in second conversion entity 214. Similarly, third gate drive card 406A can be connected to a second gate drive card 404A, and third gate drive card 406A can be configured to control operation of the switching devices in first conversion entity 212. For example, control device 174 can be connected to first gate drive card 402A by one or more fiber-optic cables, and one or more fiber-optic cables can be connected between the first gate drive card 402A and second gate drive card 404A, and between the second gate drive card 404A and third gate drive card 406A.

First gate drive card 402A can further be daisy chained to other inverter blocks. For example, first gate drive card 402A associated with a first inverter block 206A can be connected to a first gate drive card 402B associated with a second inverter block 206B, as depicted in FIG. 4. Moreover, first gate drive card 402A can be configured to implement a gating delay, such as a 1 to 2 microsecond delay, to generate a delayed gating command. First gate drive card 402A can further be configured to provide the delayed gating command to a second gate card drive, such as first gate drive card 402B associated with a second inverter block 206B.

Figure 5:
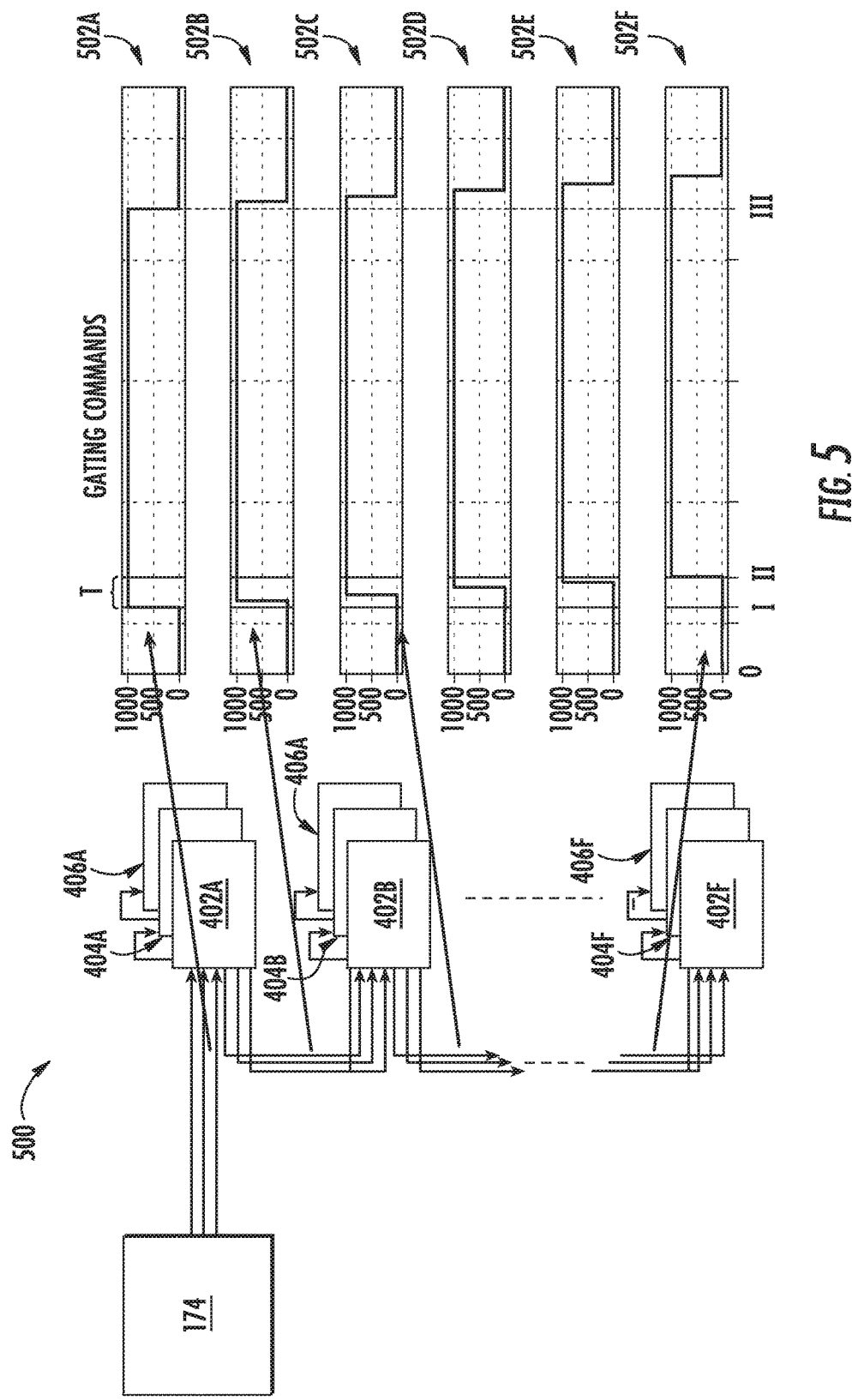
FIG. 5 depicts a control system for a power converter according to example aspects of the present disclosure.

Referring now to FIG. 5, an example control system 500 according to example aspects of the present disclosure is depicted. Elements that are the same or similar to those in FIGS. 1-4 are referred to with the same reference numerals. As shown, a control device 174 can be configured to provide one or more gating commands to a first gate drive card 402A associated with a first inverter block 206A. As depicted, first gate drive card 402A can be connected to a second gate drive card 404A, which can be connected to a third gate drive card 406A, both of which are also associated with the first inverter block 206A. further, as depicted first gate drive card 402A can be arranged in a daisy chain configuration with a second gate drive card 402B associated with a second inverter block 206B, which can similarly be arranged in a daisy chain configuration with a third gate drive card 402C associated with a third inverter block 206C. Any number of inverter blocks and associated gate drive cards 402 can similarly be arranged in a daisy chain configuration. For example, as shown in FIG. 5, six gate drive cards 402A-F are arranged in a daisy chain configuration, with each gate drive card 402 associated with an inverter block daisy chained to at least one of the one or more associated gate drive cards of another inverter block. Moreover, each gate drive card 402 associated with an inverter block can be connected to gate drive cards 404 and 406, as depicted in FIG. 5.

As depicted in FIG. 5, one or more gating commands can be provided by the control device 174 to a first gate drive card 402A. For example, as shown, gating command 502A can be provided by the control device 174. Gating command 502A can be, for example, an on/off pulse configured to turn the converter on for a period of time before turning the converter off. For example, as depicted, the gating command 502A from time 0 to time I is an off command, from time I to time III it is an on command, and from time III onward it is an off command.

The control system 500 can be configured to implement a gating command delayed to generate a first delayed gating command 502B based at least in part on the one or more gating commands. For example, a first gate drive card 402A can be configured to implement a gating command delay, such as a gating command delay of 1-2 microseconds, to generate a first delayed gating command 502B. Further, the first delayed gating command 502B can be provided by the control system to a second inverter block. For example, the first gate drive card 402A associated with the first inverter block 206A can provide the first delayed gating command 502B to the first gate drive card 402B associated with a second inverter block 206B. Similarly, first gate drive card 402B associated with second inverter block 206B can be configured to implement a second gating command delay to generate a second delayed gating command 502C based at least in part on the first delayed gating command 502B. Further, the control system can provide the second delayed gating command 502C to a third inverter block 206C such as, for example, by providing the second delayed gating command 502C from first gate drive card 402B associated with second inverter block 206B to a first gate drive card 402C associated with a third inverter block 206C. Similarly, third delayed gating command 502D can be generated and provided to a fourth inverter block 206D, a fourth delayed gating command 502E can be provided to a fifth inverter block 206E, and a fifth delayed gating command 502F can be provided to a sixth inverter block 206F. In this way, the control system 500 can implement a gating command delay to generate delayed gating commands based at least in part on the one or more gating commands. Further, in this way, the control system 500 can provide the one or more delayed gating commands to downstream inverter blocks 206 in the daisy chain configuration.

In an embodiment, the gating command delay can be based at least in part on the number of inverter blocks in the converter. For example, a total delay T can be defined as the gating command delay for each inverter block 206A-F summed together, as depicted in FIG. 5. The total delay T can be a delay that is shorter than the on period of the on/off pulse in the one or more gating commands 502A. For example, the on/off pulse can be one or more gating commands to turn all inverter blocks 206 in a converter on such that all inverter blocks 206 are contributing to a total output voltage of the converter. In order to generate the desired voltage output, the total delay T can be shorter than the on period of the on/off pulse so that all inverter blocks 206 contribute to the output voltage for at least a portion of the on period, as depicted in FIG. 5.

Referring now to FIGS. 6 and 7, graphical illustrations of EMI generated by converters are depicted. FIG. 6 depicts an EMI spectrum for various frequencies in a converter in which no delay is implemented in gating commands provided to the inverter blocks 206 of the converter. The EMI can be generated by electromagnetic induction of components in the converter due to the rapid change in voltage over time (dv/dt). For example, an inverter block utilizing SiC MOSFETs can be configured to turn on from 0 V to 1000 V in 25 nanoseconds; thus, the change in voltage over time (dv/dt) can be 40kV/microsecond. Further, in a converter utilizing six inverter blocks, when all inverter blocks are switched on at the same time, the change in voltage over time can be 240kV/microsecond. However by implementing a 1 microsecond delay between inverter blocks for a total delay of 5 microseconds, the dv/dt for the 6000 volt transition is reduced to 1.2kV/microsecond. By implementing a delay, the EMI generated by the inverter blocks 206 can be significantly reduced.

For example, FIG. 7 depicts an EMI spectrum for various frequencies in a converter in which a 2 microsecond delay has been implemented in gating commands provided to the inverter blocks 206 of the converter. As shown in FIG. 7, the EMI generated by the inverter blocks across the same frequency spectrum is significantly reduced as compared to the EMI spectrum in which no delay has been implemented as depicted in FIG. 6. By implementing a delay, the amount of EMI generated can be reduced, which can allow for the use of a smaller filter in a power converter to condition the power output into a form suitable for use on an electrical grid. This can reduce the costs of a power conversion system, since larger filters are typically more expensive than smaller filters.

Figure 8:
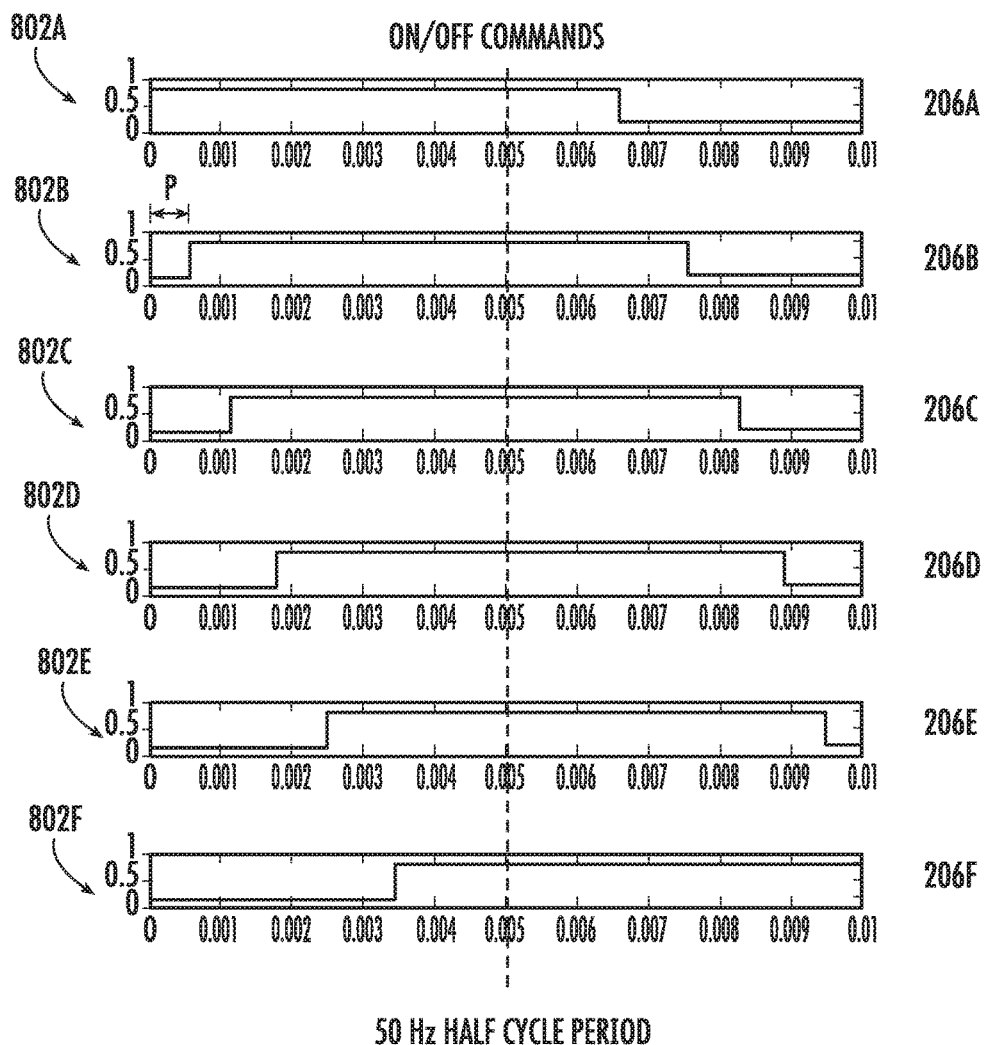
FIG. 8 depicts an example switching strategy according to example aspects of the present disclosure.

Referring now to FIG. 8, a switching strategy according to example aspects of the present disclosure is depicted. FIG. 8 depicts a plurality of gating commands each configured to generate a fixed pulse output. For example, a first gating command 802A can be provided to a first inverter block 206A to switch both an inner converter 240 and an outer converter 216 on concurrently for a period of time. For example, as depicted, first gating command 802A is a two-thirds duty-cycle gating command such that a full voltage is provided by first inverter block 206A for two-thirds of a half cycle and a zero voltage for one-third of the half cycle.

Similarly, a second gating command 802B can be provided to a second inverter block 206B, a third gating command 802C can be provided to a third inverter block 206C, a fourth gating command 802B can be provided to a fourth inverter block 206D, a fifth gating command 802E be provided to a fifth inverter block 206E, and a sixth gating command 802F can be provided to a sixth inverter block 206F.

However, as depicted in FIG. 8, each of the gating commands 802B-F can be shifted by one or more phase shifts. For example, a second gating command 802B has been shifted by a phase shift "P," which can be accomplished by implementing a gating command delay to generate the phase shift. For example, a control system can be configured to generate a delayed gating command, such as a second gating command 802B, by implementing gating command delay to generate a phase shift P in the fixed pulse output generated by the one or more gating commands, such as a first gating command 802A. Similarly, a control system can implement additional gating command delays to generate additional phase shifts in the fixed pulse outputs generated by gating commands 802C-F.

Further, the phase shift for a gating command can be based at least in part on the number of inverter blocks in the converter. For example, a phase shift can be generated by delaying one or more gating commands to generate a fixed pulse output based on the number of inverter blocks in a converter. In an embodiment, a phase shift can be used to generate a sinusoidal output waveform by shifting the fixed pulse output for each inverter block by a phase shift P, which can be calculated by dividing 360 degrees by the number of modules. For example, in a converter with six inverter blocks, a phase shift P can correspond to a 60 degree phase shift, whereas in a converter with five inverter blocks, a phase shift P can correspond to a 72 degree phase shift. Further, the fixed pulse duty-cycle can be modulated to generate a particular peak voltage output.

In this way, a gating command delay can be used to generate a phase shift and can be implemented in in one or more gating commands configured to generate a fixed pulse output in order to generate a desired voltage waveform, such as a sinusoidal waveform suitable for use on an alternating current electrical grid. Further, the average power processed by each inverter block in such a configuration can be normalized across the inverter blocks, equalizing the thermal stresses on the inverter blocks. Further, this can simplify a cooling system for a converter because all inverter blocks will have approximately equal cooling requirements.

Figure 9:
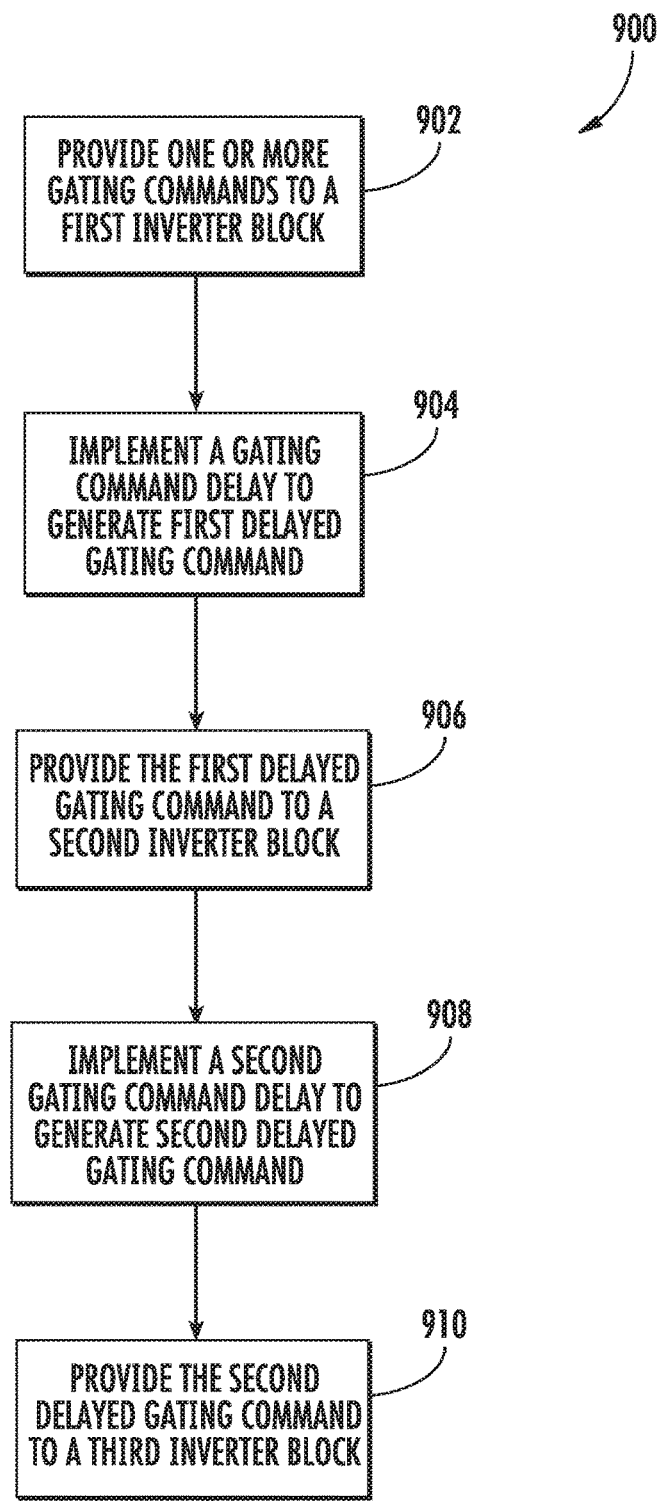
FIG. 9 depicts an example method according to example aspects of the present disclosure.

Referring now to FIG. 9, an example control method (900) for operating a converter according to example aspects of the present disclosure is depicted. A converter can include a plurality of inverter blocks. Each inverter block can include one or more SiC MOSFETS. For example, each inverter block can be a DC to DC to AC inverter block, which can include a first conversion entity, a second conversion entity, a third conversion entity, and an isolation transformer. Each inverter block can include a plurality of switching devices, which can be one or more SiC MOSFETS. The converter can be, for example, a line side converter 168 in a wind power generation system 100.

At (902), the control method (900) can include providing, by a control system, one or more gating commands to a first inverter block in the plurality of inverter blocks. For example, a first gating command 502A/802A can be provided by a control device 174 to a first gate drive card 402A associated with a first inverter block 206A. The first gate drive card 402A can be configured to drive the one or more switching devices, such as one or more SiC MOSFETs, in the first inverter block 206A.

At (904), the control method (900) can include implementing a gating command delay to generate a first delayed gating command based at least in part on the one or more gating commands. For example, a first gate drive card 402A can be configured to implement a gating command delay, such as a delay of 1-2 microseconds, to generate a first delayed gating command 502B. Further, a gating command delay can be a delay configured to generate a phase shift in a fixed pulse output for an inverter block. For example, a gating command delay can be implemented to generate a second gating command 802B shifted by a phase shift P.

At (906), the control method (900) can include providing the first delayed gating command to a second inverter block in the plurality of inverter blocks. For example, a first gate drive card 402A associated with a first inverter block 206A can provide the first delayed gating command 502B/802B to a first gate drive card 402B associated with a second inverter block 206B. The first gate drive card 402B can then provide the first delayed gating command 502B/802B to the second inverter block 206B. In an embodiment, the first gate drive card 402A associated with the first inverter block 206A and the first gate drive card 402B associated with the second inverter block 206B can be arranged in a daisy chain configuration.

At (908), the control method (900) can include implementing a gating command delay to generate a second delayed gating command based at least in part on first delayed gating command. For example, a first gate drive card 402B can be configured to implement a second gating command delay, such as a delay of 1-2 microseconds, to generate a second delayed gating command 502C. Further, a gating command delay can be a delay configured to generate a second phase shift in a fixed pulse output for an inverter block. For example, a gating command delay can be implemented to generate a third gating command 802C shifted by a phase shift P.

At (910), the control method (900) can include providing the second delayed gating command to a third inverter block in the plurality of inverter blocks. For example, a first gate drive card 402B associated with a second inverter block 206B can provide the second delayed gating command 502C/802C to a first gate drive card 402C associated with a third inverter block 206C. The first gate drive card 402C can then provide the first delayed gating command 502C/802C to the third inverter block 206C. In an embodiment, the first gate drive card 402B associated with the second inverter block 206B and the first gate drive card 402C associated with the third inverter block 206C can be arranged in a daisy chain configuration.

Figure 10:
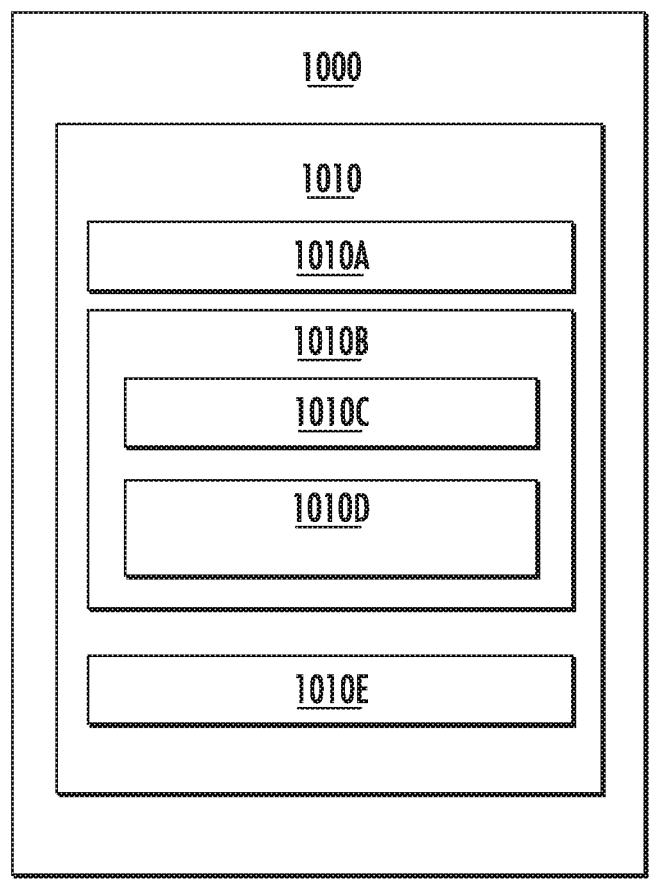
FIG. 10 depicts elements suitable for use in a control device according to example aspects of the present disclosure

FIG. 10 depicts an example control device 1000 according to example aspects of the present disclosure. The control device 1000 can be used, for example, as a control device 174 or a control system 176 in a wind power generation system 100. The control device 1000 can include one or more computing device(s) 1100. The computing device(s) 1100 can include one or more processor(s) 1100A and one or more memory device(s) 1100B. The one or more processor(s) 1100A can include any suitable processing device, such as a microprocessor, microcontrol device, integrated circuit, logic device, and/or other suitable processing device. The one or more memory device(s) 1100B can include one or more computer-readable media, including, but not limited to, non-transitory computer-readable media, RAM, ROM, hard drives, flash drives, and/or other memory devices.

The one or more memory device(s) 1100B can store information accessible by the one or more processor(s) 1100A, including computer-readable instructions 1100C that can be executed by the one or more processor(s) 1100A. The instructions 1100C can be any set of instructions that when executed by the one or more processor(s) 1100A, cause the one or more processor(s) 1100A to perform operations. In some embodiments, the instructions 1100C can be executed by the one or more processor(s) 1100A to cause the one or more processor(s) 1100A to perform operations, such as any of the operations and functions for which the computing system 1000 and/or the computing device(s) 1100 are configured, the operations for controlling a converter (e.g., control method 900), as described herein, and/or any other operations or functions of the one or more computing device(s) 1100. The instructions 1100C can be software written in any suitable programming language or can be implemented in hardware. Additionally, and/or alternatively, the instructions 1100C can be executed in logically and/or virtually separate threads on processor(s) 1100A. The memory device(s) 1100B can further store data 1100D that can be accessed by the processor(s) 1100A. For example, the data 1100D can include data indicative of power flows, current flows, temperatures, actual voltages, nominal voltages, gating commands, switching patterns, and/or any other data and/or information described herein.

The computing device(s) 1100 can also include a network interface 1100E used to communicate, for example, with the other components of system 1000 (e.g., via a network). The network interface 1100E can include any suitable components for interfacing with one or more network(s), including for example, transmitters, receivers, ports, control devices, antennas, and/or other suitable components. For example, the network interface 1100E can be configured to communicate with one or more sensors in a wind power generation system 100, such as one or more voltage sensors or temperature sensors. Further, the network interface 1100 can be configured to communicate with a control system, such as a control system 176, or control device, such as a control device 174.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The present disclosure is discussed with reference to DFIG power generation systems including a power converter utilizing SiC MOSFETs for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for operating a converter, the converter comprising a plurality of inverter blocks, each inverter block comprising a plurality of switching devices, the plurality of switching devices comprising one or more silicon carbide MOSFETs, the method comprising:

providing, by a control system, one or more gating commands to a first inverter block in the plurality of inverter blocks, the one or more gating commands comprising an on/off pulse configured to turn the first inverter block on for a period of time before turning the first inverter block off;

implementing, by the control system, a first gating command delay to generate a first delayed gating command based at least in part on the one or more gating commands;

providing, by the control system, the first delayed gating command to a second inverter block in the plurality of inverter blocks;

implementing, by the control system, a second gating command delay to generate a second delayed gating command based at least in part on the first delayed gating command; and providing, by the control system, the second delayed gating command to a third inverter block in the plurality of inverter blocks, wherein a total delay comprises a sum of the first gating command delay and the second gating command delay, and wherein the total delay is shorter than an on period of the on/off pulse.

2. The control method of claim 1, wherein:

providing one or more gating commands to a first inverter block comprises providing the one or more gating commands to a gate drive card associated with the first inverter block, the gate drive card associated with the first inverter block configured to provide the one or more gating commands to the plurality of switching devices in the first inverter block;

providing the first delayed gating command to a second inverter block comprises providing the first delayed gating command to a gate drive card associated with the second inverter block, the gate drive card associated with the second inverter block configured to provide the first delayed gating command to the plurality of switching devices in the second inverter block;

providing the second delayed gating command to a third inverter block comprises providing the second delayed gating command to a gate drive card associated with the third inverter block, the gate drive card associated with the third inverter block configured to provide the second delayed gating command to the plurality of switching devices in the third inverter block; and the gate drive card associated with the first inverter block, the gate drive card associated with the second inverter block, and the gate drive card associated with the third inverter block are arranged in a daisy chain configuration.

3. The control method of claim 1, wherein the first gating command delay is based at least in part on the number of inverter blocks in the converter.

4. The control method of claim 1, wherein the first gating command delay comprises a delay of 1-2 microseconds.

5. The control method of claim 1, wherein the one or more gating commands comprise one or more gating commands configured to generate a fixed pulse output.

6. The control method of claim 5, wherein the first gating command delay comprises a delay to generate a phase shift in the fixed pulse output for each of the plurality of inverter blocks.

7. The control method of claim 6, wherein the phase shift is based at least in part on the number of inverter blocks in the converter.

8. The control method of claim 7, wherein the one or more gating commands configured to generate a fixed pulse output are provided to each of the plurality of inverter blocks; and
wherein the fixed pulse output for each of the plurality of inverter blocks is phase shifted from the fixed pulse output for all other inverter blocks.

9. A power conversion system, comprising:
a converter comprising a plurality of inverter blocks, each inverter block comprising a plurality of switching devices, the plurality of switching devices comprising one or more silicon carbide MOSFETs; and
a control system configured to perform operations comprising:
providing one or more gating commands to a first inverter block of the plurality of inverter blocks, the one or more gating commands comprising an on/off pulse configured to turn the first inverter block on for a period of time before turning the first inverter block off;
implementing a first gating command delay to generate a first delayed gating command based at least in part on the one or more gating commands;
providing the first delayed gating command to a second inverter block in the plurality of inverter blocks;
implementing a second gating command delay to generate a second delayed gating command based at least in part on the first delayed gating command; and
providing the second delayed gating command to a third inverter block in the plurality of inverter blocks,
wherein a total delay comprises a sum of the first gating command delay and the second gating command delay, and
wherein the total delay is shorter than an on period of the on/off pulse.

10. The power conversion system of claim 9, wherein:
providing one or more gating commands to a first inverter block comprises providing the one or more gating commands to a gate drive card associated with the first inverter block, the gate drive card associated with the first inverter block configured to provide the one or more gating commands to the plurality of switching devices in the first inverter block;
providing the first delayed gating command to a second inverter block comprises providing the first delayed gating command to a gate drive card associated with the second inverter block, the gate drive card associated with the second inverter block configured to provide the first delayed gating command to the plurality of switching devices in the second inverter block;
providing the second delayed gating command to a third inverter block comprises providing the second delayed gating command to a gate drive card associated with the third inverter block, the gate drive card associated with the third inverter block configured to provide the second delayed gating command to the plurality of switching devices in the third inverter block; and
the gate drive card associated with the first inverter block, the gate drive card associated with the second inverter block, and the gate drive card associated with the third inverter block are arranged in a daisy chain configuration.

11. The power conversion system of claim 9, wherein the first gating command delay is based at least in part on the number of inverter blocks.

12. The power conversion system of claim 9, wherein the one or more gating commands comprise one or more gating commands configured to generate a fixed pulse output;
wherein the one or more gating commands configured to generate a fixed pulse output are provided to each inverter block in the converter; and
wherein the fixed pulse output for each inverter block is phase shifted from the fixed pulse output for all other inverter blocks.

13. The power conversion system of claim 9, wherein the first gating command delay comprises a delay of 1-2 microseconds.

14. The power conversion system of claim 9, wherein the plurality of inverter blocks comprises a plurality of DC to DC to AC inverter blocks.

15. The power conversion system of claim 14, wherein the plurality of DC to DC to AC inverter blocks each comprise a first conversion entity, a second conversion entity, a third conversion entity, and an isolation transformer;
wherein first conversion entity is a DC to AC conversion entity;
wherein second conversion entity is a AC to DC conversion entity;
wherein the isolation transformer is coupled between the first conversion entity and the second conversion entity; and
wherein third conversion entity is a DC to AC conversion entity.

16. The power conversion system of claim 15, wherein the control system comprises:
a first gate drive card associated with the first inverter block, the first gate drive card configured to provide the one or more gating commands to the first conversion entity;
a second gate drive card associated with the first inverter block, the second gate drive card configured to provide the one or more gating commands to the second conversion entity; and
a third gate drive card associated with the first inverter block, the third gate card configured to provide the one or more gating commands to the third conversion entity.

17. A wind power generation system, comprising:
a wind power generator configured to generate AC power;
an AC to DC converter coupled to the wind power generator, the AC to DC converter configured to convert the AC power from the wind power generator to a DC power;
a DC link coupled to the AC to DC converter, the DC link configured to receive DC power from the AC to DC converter;
a DC to AC converter coupled to the DC link, the DC to AC converter configured to receive DC power from the DC link; the DC to AC converter comprising a plurality of inverter blocks, each inverter block comprising a plurality of switching devices, the plurality of switching devices comprising one or more silicon carbide MOSFETs; and
a control system configured perform operations comprising:
providing one or more gating commands to a first inverter block of plurality of inverter blocks included in the DC to AC converter, the one or more gating commands comprising an on/off pulse configured to turn the first inverter block on for a period of time before turning the first inverter block off;
implementing a first gating command delay to generate a first delayed gating command based at least in part on the one or more gating commands;

providing the first delayed gating command to a second inverter block of the plurality of inverter blocks included in the DC to AC converter;

implementing a second gating command delay to generate a second delayed gating command based at least in part on the first delayed gating command; and providing the second delayed gating command to a third inverter block of the plurality of inverter blocks included in the DC to AC converter, wherein a total delay comprises a sum of the first gating command delay and the second gating command delay, and wherein the total delay is shorter than an on period of the on/off pulse.

* * * * *

UNITED STATES PATENT AND TRADEMARK OFFICE
CERTIFICATE OF CORRECTION

Page 1 of 1

PATENT NO. : 10,148,205 B2
APPLICATION NO. : 15/422604
DATED : December 4, 2018
INVENTOR(S) : Robert Gregory Wagoner et al.

It is certified that error appears in the above-identified patent and that said Letters Patent is hereby corrected as shown below:

In the Specification

In Column 1, following the title and preceding the FIELD section please insert:
--STATEMENT REGARDING FEDERALLY SPONSORED RESEARCH OR DEVELOPMENT
This invention was made with Government support under Contract No. DE-EE0007252 awarded by the U.S. Department of Energy (DOE). The Government has certain rights in the invention.--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*